UNITED STATES PATENT OFFICE.

THOMAS W. PRITCHARD, OF WILMINGTON, NORTH CAROLINA.

CLEANING AND SCOURING COMPOUND.

1,407,297. Specification of Letters Patent. Patented Feb. 21, 1922.

No Drawing. Application filed September 24, 1917, Serial No. 192,961. Renewed July 7, 1921. Serial No. 483,088.

*To all whom it may concern:*

Be it known that I, THOMAS W. PRITCHARD, a citizen of the United States, residing at Wilmington, in the county of New Hanover, State of North Carolina, have invented certain new and useful Improvements in Cleaning and Scouring Compounds, of which the following is a description.

My invention relates to solvent cleaner and scouring compounds and has for its object to produce a compound of this character which will be inexpensive to produce, stable in character and effective in removing grease and dirt without injury to the material to which it is applied.

With these objects in view my invention consists in the cleaning and scouring compound hereinafter described and claimed and in the process of compounding it.

The essential element of my compound is pine oil that is the oil obtained from resinous pine or fir wood by destructive distillation or by any process by which turpentine is obtained, and is a clear liquid of oily consistency varying in color from white to yellow having an odor somewhat suggestive of freshly cut pine saw-dust having a specific gravity varying from .89 to .95 at 20° C. and a refractive index at 20° C. approximately around 1.4860 and is free from turpentine and also free from any creosote or other products of destructive distillation of the wood. In the ordinary process of dry distillation of pine wood the pine oil is carried off with the turpentine by a heat less than that necessary to produce destructive distillation and is subsequently separated from the crude turpentine by distillation, the turpentine being first distilled off. This pine oil is only slightly soluble in water and while known to be capable of dissolving many substances not readily soluble cannot readily be used for cleaning or scouring purposes because of its practical insolubility in water. The precise composition of pine oil is somewhat variable and all its constituents are not known to me. Furthermore, in recent years the article sold as pine oil has varied considerably in its composition. I am, therefore, as yet unable to say the precise constituent or constituents of pine oil which give to it the great advantage that I have discovered in the treatment of textiles. In referring herein to pine oil, therefore, I wish to be understood to mean those volatile distillates containing an effective proportion of the essential constituents of pine oil or equivalents thereof. As stated above pine oil is only slightly soluble in water but I am not certain whether in all cases the soluble constituents contribute to the action. In some specimens of pine oil the soluble constituents seem to have an activizing effect on the whole body of the material.

In preparing the cleaner and scouring compound I take one part of neutral vegetable oil soap, such as castile soap and three parts of water and dissolve the soap in the water. I then heat the solution and add gradually the pine oil sufficient to form a gelatinous mixture of about the consistency of table jelly. The amount of pine oil necessary is about two parts to 4 parts of the mixture so that the mixture when complete contains about one part by weight of soap, two parts of pine oil and three parts of water. The mixture is a colloidial mass in which the ingredients are so combined that none of them can be distinguished or separated out and no amount of dilution will effect any separation.

In use in cleaning and scouring textiles or textile materials, the fabric or yarn is boiled in a dilute solution of the compound and subsequently rinsed. When so treated the fabric or yarn is completely freed from grease or dirt without injurious effect upon the most delicate material and after rinsing is entirely free from odor. It is applicable alike to cotton, silk or wool and while finding perhaps its greatest use in cleaning and scouring textile fabrics and materials is adapted for general cleaning purposes.

It will, of course, be understood that the proportions of the ingredients above stated are approximate only and I do not desire to be limited to the proportions named.

Having thus described my invention what I claim is:

1. The herein described cleaning and scouring compound consisting of soap produced from natural fat and alkali, water, and pine oil produced from resinous wood by distillation and free from turpentine.

2. The herein described cleaning and scouring compound consisting of soap produced from vegetable oil and alkali, water, and pine oil produced from resinous wood by distillation and free from turpentine.

3. The herein described cleaning and scouring compound consisting of soap produced from vegetable oil and alkali, water, and pine oil produced from resinous wood by distillation and free from turpentine, combined together to form a colloidal mass.

4. The herein described cleaning and scouring compound consisting of soap produced from vegetable oil and alkali, water, and pine oil produced from resinous wood by distillation and free from turpentine, in the proportions of one part of soap, three parts of water and two parts of pine oil.

5. The herein described process of forming a colloidal mass containing pine oil produced from resinous wood by distillation and slightly soluble only in water, which consists in dissolving soap produced from natural fat and alkali in water, heating the solution and gradually introducing the pine oil.

In testimony whereof I affix my signature this 21st day of Sept., 1917.

THOMAS W. PRITCHARD.